Dec. 9, 1941.  H. L. BOWERS ET AL  2,265,683
CONTROL COLUMN
Filed Dec. 30, 1938   3 Sheets-Sheet 1
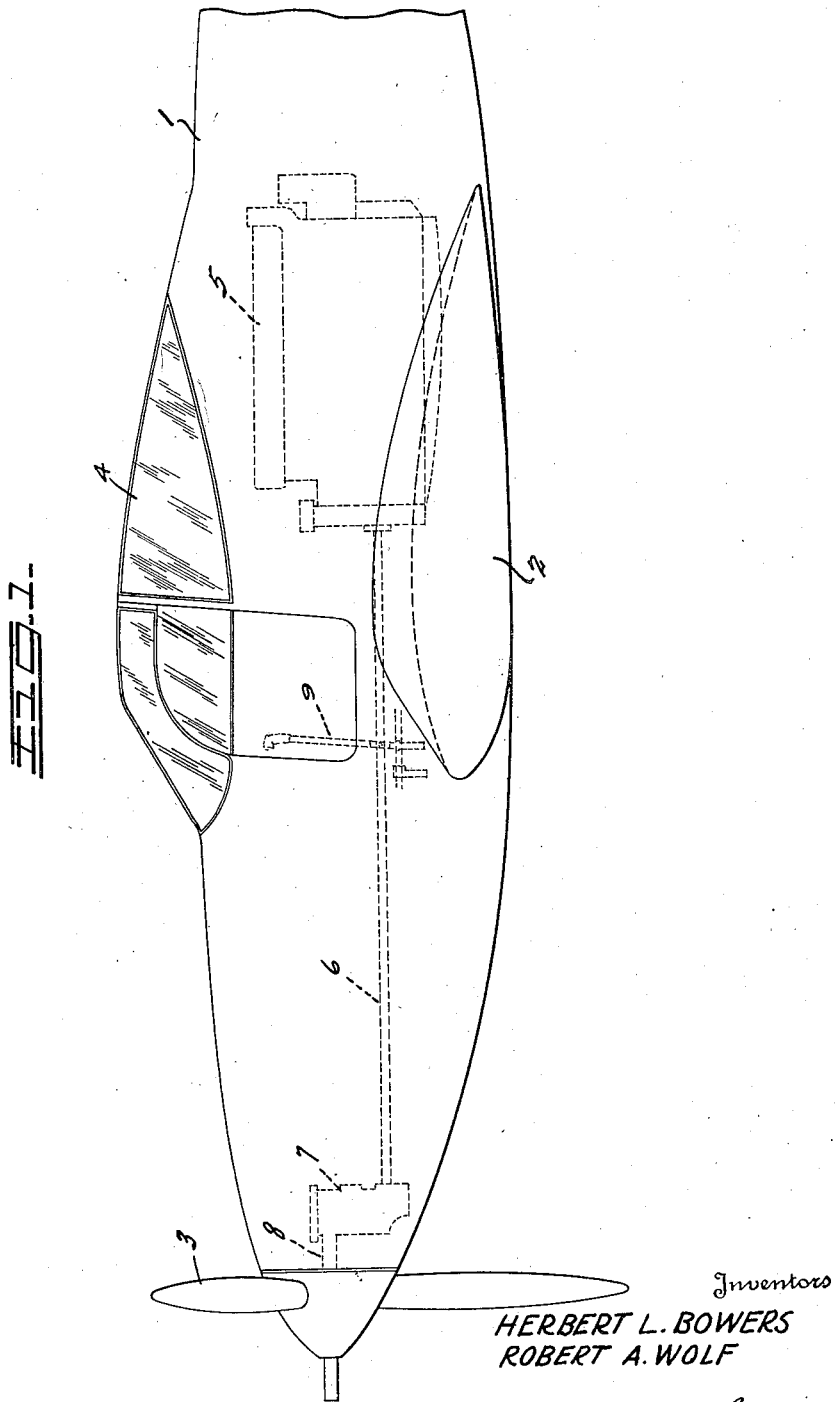
Inventors
HERBERT L. BOWERS
ROBERT A. WOLF
By Semmes Keegin & Semmes
Attorneys

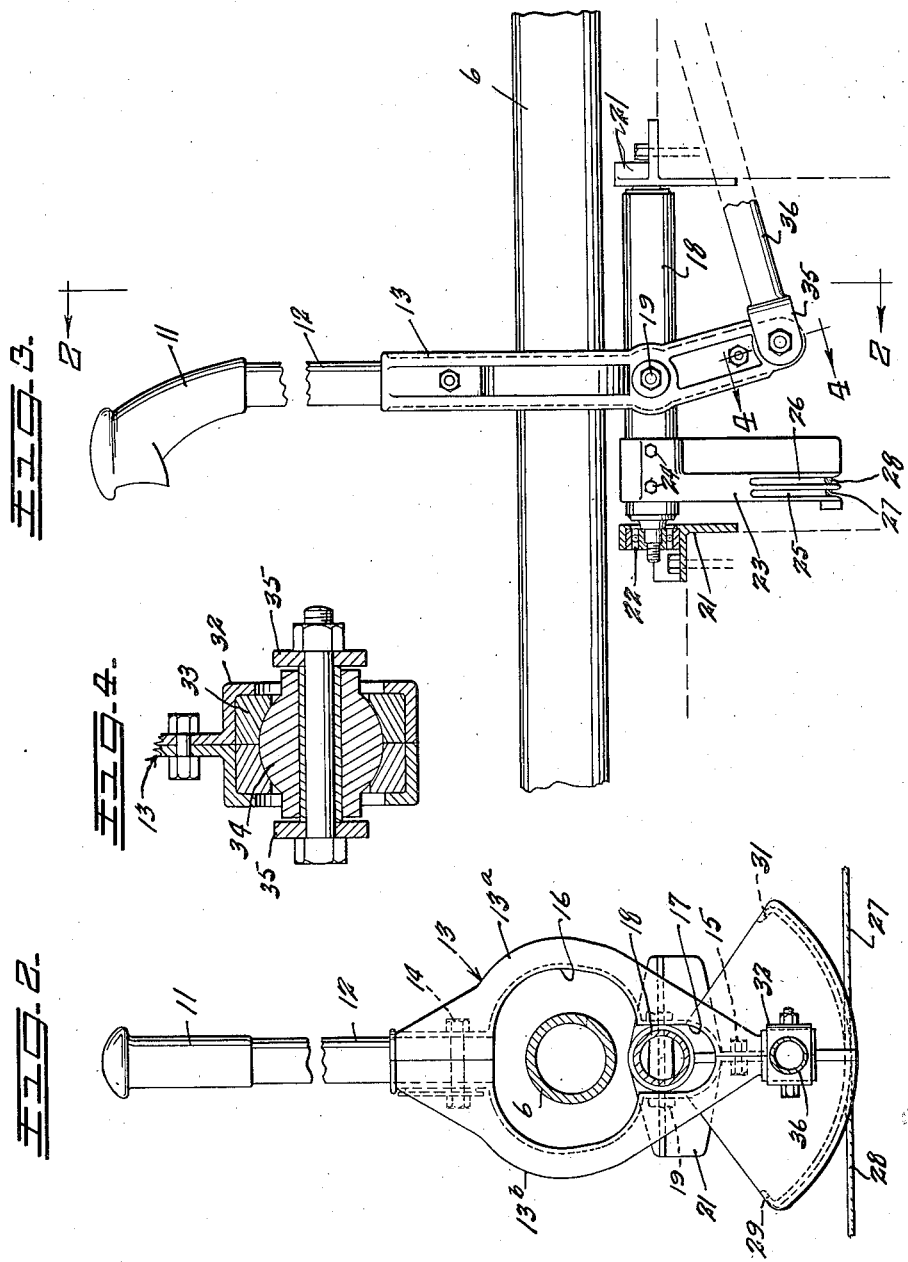

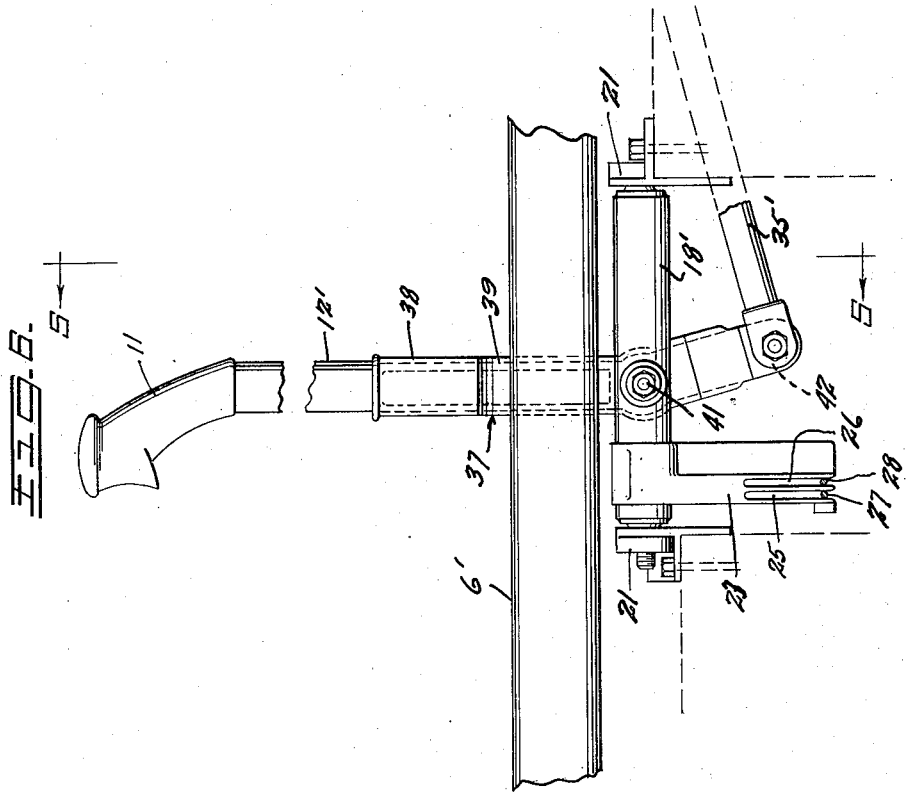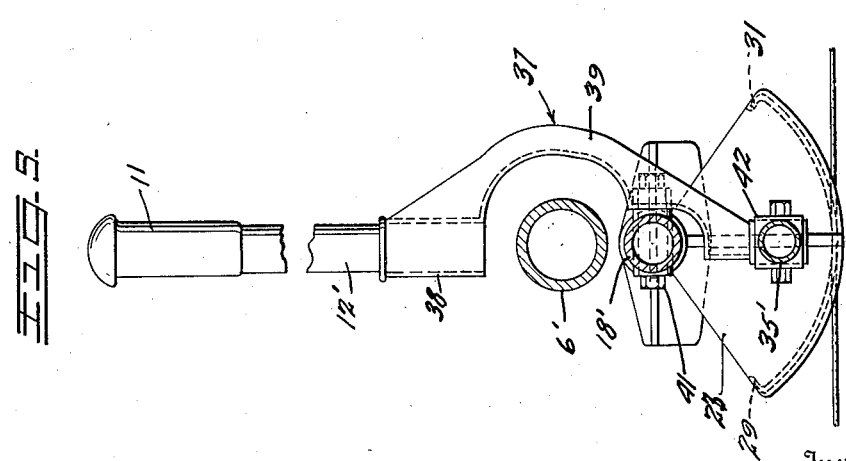

Patented Dec. 9, 1941

2,265,683

UNITED STATES PATENT OFFICE 2,265,683

CONTROL COLUMN

Herbert L. Bowers and Robert A. Wolf, Kenmore, N. Y., assignors to Bell Aircraft Corporation, Buffalo, N. Y., a corporation of New York Application December 30, 1938, Serial No. 248,641

3 Claims. (Cl. 244—83)

The present invention relates to control columns and more particularly to a control column for use in an airplane where the pilot's seat is intermediate the power plant and the propeller, and in which a power shaft will pass through the plane of the control column and would normally intersect the column. While we have shown and described our inventive concept in connection with a tractor type airplane in which the power plant is disposed to the rear of the pilot, it is, of course, obvious that our invention is of broader application.

It is well known in the aviation industry that the maneuverability of an airplane is materially improved if the power plant is mounted substantially at the center of gravity of the plane. However, with the power plant thus located, it is necessary to provide the power shaft with an extension in order to drive the propeller. It will be appreciated, therefore, that a very important problem is to provide a column that may be freely operated without contacting or impeding the operation of the power shaft or the column itself.

An object of this invention is to provide such a column, which will be located in its normal position—namely, immediately before the pilot, and usually in the transverse center of the fuselage—and which will be of simple construction and efficient in operation.

In general, our invention embraces the concept of mounting the control column for universal movement, and so forming the portion of the column adjacent the power shaft that there may be free movement of the column without contacting the power shaft. More specifically, the control column is pivoted below the power shaft, while the handle or grip is, of course, above the shaft. In the preferred embodiment, the control column is mounted for fore and aft movement on a member which, in turn, is pivoted to permit transverse movement of the control column.

In the drawings:

Figure 1 is a schematic view of the fore part of an airplane equipped with our invention.

Figure 2 is a rear view in elevation of the control column and associated mechanism, and taken along the line 2—2 of Figure 3 looking in the direction of the arrows.

Figure 3 is a side view in elevation of the device shown in Figure 2.

Figure 4 is a view taken along line 4—4 of Figure 3 looking in the direction of the arrows.

Figure 5 is a rear view in elevation of a modified form of control column and associated parts, and taken along line 5—5 of Figure 6 looking in the direction of the arrows.

Figure 6 is a side elevational view, partly broken away of the device shown in Figure 5.

To facilitate a comprehension of our invention we have shown schematically in Figure 1, the relationship of the control column to the remainder of the plane. As there shown, the plane is composed of the fuselage 1, wings 2, propeller 3, and cockpit or pilot's compartment 4. It will be noted that in this plane the engine 5 is located to the rear of the pilot, and drives the propeller by means of a power shaft 6 which extends to a gear box 7, in which gears translate the drive of power shaft 6 to a propeller stub shaft 8.

It will be appreciated that preferred airplane design requires that the engine and power shaft 6 shall be in the longitudinal center line of the plane, which, of course, is also true of the pilot's seat and the control column, designated generally as 9 in Figure 1. As stated, the plane shown in Figure 1 is schematic entirely, and our invention is applicable to any other type of aircraft in which a control column and a shaft lie within the same vertical plane.

Considering now the control column in more detail, and as best indicated by Figures 2 and 3, the column is composed of a handle or grip portion 11, a shaft or a body portion 12 and what may be termed a cutaway portion 13. The cutaway portion 13 is made up of two corresponding sections 13a and 13b bolted together as at 14 and 15 to form the single unit 13.

The cutaway portion 13, of course, holds the shaft or body portion 12 securely, and the individual members 13a and 13b are so formed that, when assembled, the cutaway portion 13 provides a substantially circular aperture 16 through which the power shaft 6 extends. It will be noted that sufficient clearance is afforded by the aperture 16 to permit free transverse, and fore and aft movement of the control column without contact with the power shaft 6.

As best shown in Figure 2, it will be noted that the aperture 16 is extended downwardly to form a channel 17 which is adapted to receive a cylindrical support 18 for the control column. The cutaway member 13 is pivoted to the support 18 by a bolt or the like 19, and the control column may therefore be moved fore and aft on the support 18.

The support 18, at its opposite ends, is journaled in brackets 21, and suitable ball bearings, as shown at 22, may be provided to reduce friction.

A segment 23 is secured to the support 18 by bolts 24, and a pair of grooves 25 and 26 are formed in the periphery of the segment. Cables 27 and 28 are disposed in the grooves 25 and 26, respectively, and are fixedly anchored to the segment, as at 29 and 31. The cables 27 and 28 control the aileron surfaces, and it will be appreciated that, as the control column is moved transversely, an actuation of the ailerons is effected. As indicated above, the control column is capable of such a transverse movement without contacting the power shaft 6 by virtue of the aperture 16 formed in the cutaway member.

The lower extremities of the corresponding sections 13a and 13b form a housing 32 for a ball and socket joint, made up of the socket blocks 33 and a ball member 34. An elevator control rod 35 is provided with a yoke 36 which is pivoted to the ball 34. Manifestly, the ball and socket joint permits transverse movement of the control column without exerting any torque on the elevator control rod 35. It is believed readily apparent that fore and aft movement of the control column will serve to operate the elevators of the airplane.

In Figures 5 and 6, we have shown a control column which is substantially the same as that shown in Figures 2 and 3, but with one slight variation in the construction of the member which surrounds the power shaft. In the case of the control column shown in Figures 5 and 6, there is substituted for the cutaway member 13, a member 37 which corresponds generally to only a single one of the members 13a or 13b. The member 37 is provided with a socket 38 at its upper end which is adapted to receive the body portion 12' of the control column. Extending downwardly from the socket 38 is a yoke arm 39 which surrounds one side of the power shaft 6'. The arm 39 is pivoted to the support 18' by a bolt 41, thereby providing for fore and aft movement of the control column. The lower extremity of the yoke arm 39 carries a ball and socket joint 42 similar in construction to the ball and socket shown in Figures 2 and 3 which serves to connect the elevator control rod 35' to the control column.

It will be noted that, in the case of the control column shown in Figures 5 and 6, both fore and aft and transverse movement of the control column is possible without interference with the power shaft 6', the clearance between the yoke arm 39 and the power shaft being sufficient to care for the extreme leftward movement of the control column shown in Figure 5, and the clearance between the top of the power shaft 6' and the socket 38 permitting the necessary fore and aft movement of the control column.

Both forms of control column shown herein are of simple and economical construction, yet possess sufficient strength to take care of all loads that may be imposed upon it. And it will be noted that in both cases the column may be moved the necessary distance in any direction to control the plane without contacting the propeller shaft.

While we have shown and described the preferred embodiment of our invention, we wish it to be understood that we do not confine ourselves to the precise details of construction herein set forth by way of illustration, as it is apparent that many changes and variations may be made therein, by those skilled in the art, without departing from the spirit of the invention, or exceeding the scope of the appended claims.

We claim:

1. In an airplane provided with aileron controls and an elevator control rod, a control column disposed in substantially the vertical plane of a shaft extending axially of the plane, comprising a grip member, a body member, and a base member, said base member being composed of two yoke-like members fitted together to provide an aperture through which the shaft extends, said base member being pivoted for fore and aft movement on a rotatable member located beneath the shaft, a segment mounted on said rotatable member, said segment being adapted to actuate the aileron controls, and the base member extending below its point of pivot and connected by a ball and socket joint at its lower end to an elevator control rod.

2. In an airplane having aileron controls and an elevator control rod, a control column disposed in substantially the vertical plane of a shaft extending axially of the airplane, comprising a base member composed of two yoke-like members adapted to form a socket when fitted together and to provide an aperture through which the shaft extends, a body member mounted in said socket, a rotatable member located beneath the shaft on which is pivoted the base member, a ball and socket joint attached to the extremity of the base member and connecting the said member to the elevator rod, and a grooved segment mounted on said rotatable member, said aileron controls being mounted within said grooves.

3. In an airplane having aileron controls and an elevator control rod, a control column disposed in substantially the vertical plane of a shaft extending axially of the airplane comprising a base member composed of two yoke-like members adapted when fitted together to form an aperture through which the shaft extends, a body member extending upwardly from said base member, a rotatable member located beneath the shaft and extending in parallel relation in respect to the shaft, said base member being pivotally mounted on said rotatable member and extending beneath the rotatable member, means attached to the extremity of the base member and connecting said member to the elevator rod, and a grooved segment rigidly mounted on said rotatable member, said aileron controls being mounted within said grooves.

HERBERT L. BOWERS.
ROBERT A. WOLF.